United States Patent [19]

Kling et al.

[11] 4,405,859
[45] Sep. 20, 1983

[54] NOMINAL VALUE PICK UP FOR DRIVE CONTROLS

[75] Inventors: Rudolf Kling, Darmstadt; Bernd Scheider, Darmstadt-Eberstadt, both of Fed. Rep. of Germany

[73] Assignee: Quick-Rotan Elektromotoren GmbH, Darmstadt, Fed. Rep. of Germany

[21] Appl. No.: 227,403

[22] Filed: Jan. 22, 1981

[30] Foreign Application Priority Data

Jan. 29, 1980 [DE] Fed. Rep. of Germany ....... 3003138

[51] Int. Cl.$^3$ ............................................. G01D 5/34
[52] U.S. Cl. .................................... 250/229; 250/239
[58] Field of Search ............................ 112/217.3, 275; 250/237 G, 229, 211 K, 239; 318/480

[56] References Cited

U.S. PATENT DOCUMENTS

| | | | |
|---|---|---|---|
| 3,564,376 | 2/1971 | Mais et al. | 112/275 |
| 3,946,225 | 3/1976 | Beeck | 250/237 G |
| 4,033,273 | 7/1977 | Kasuga | 112/275 |
| 4,047,025 | 9/1977 | Lemelson | 250/237 G |

*Primary Examiner*—David C. Nelms
*Attorney, Agent, or Firm*—Michael J. Striker

[57] ABSTRACT

A drive control, for example for a sewing machine, for controlling speeds and positioning of of a drive shaft driven by a drive motor includes a control box accommodating a speed control circuit and a positioning control circuit and a nominal value pick up which is releasably attachable with respect to the control box. The nominal value pick up can be fixedly adjusted on the control box.

8 Claims, 13 Drawing Figures

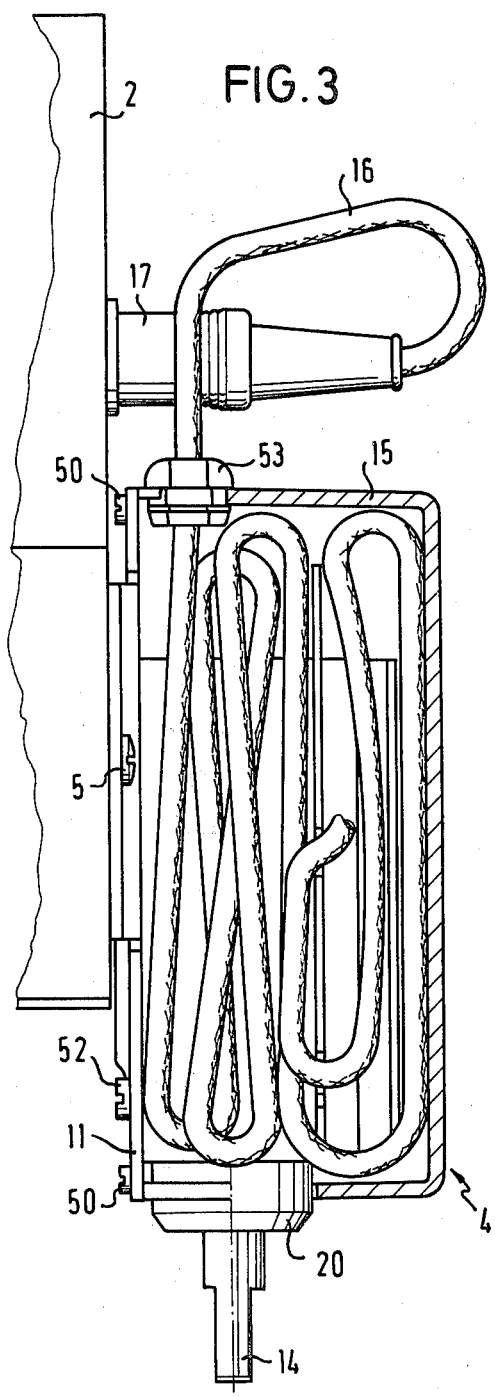
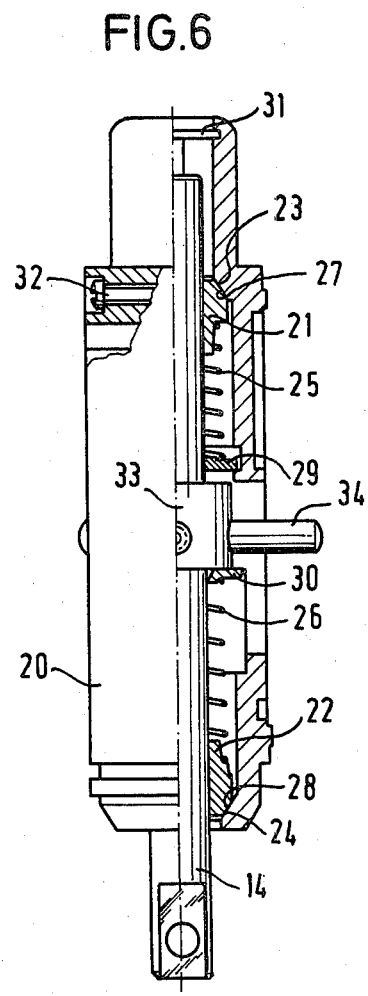

FIG.9
FIG.10
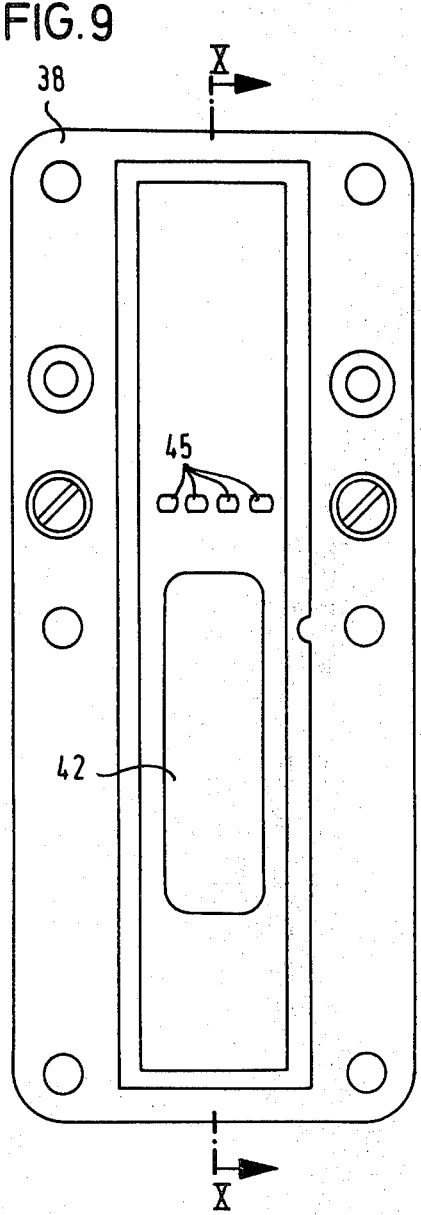
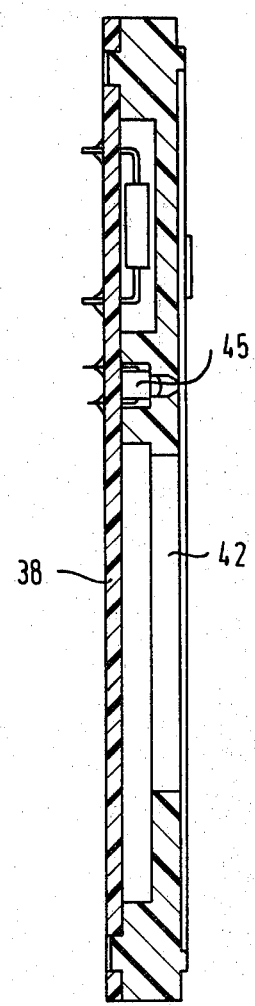

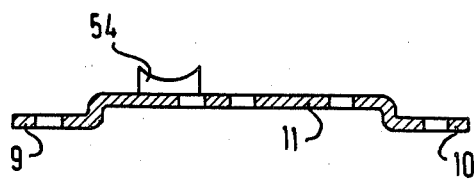
FIG.12
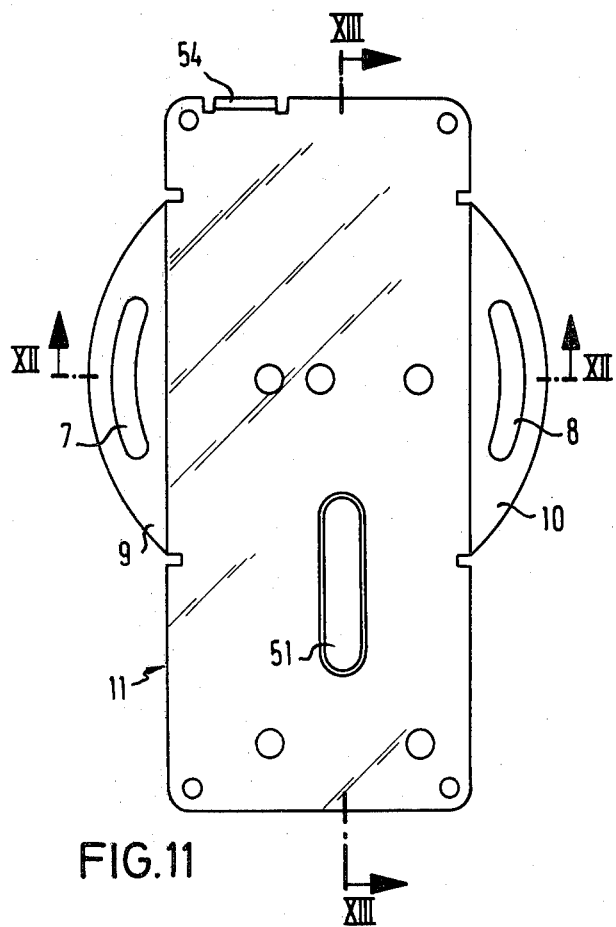
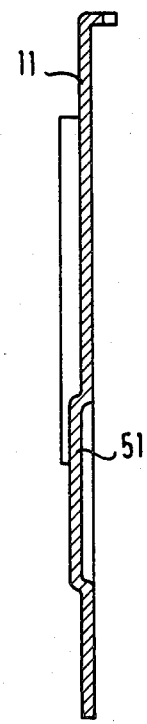
FIG.11  FIG.13

NOMINAL VALUE PICK UP FOR DRIVE CONTROLS

BACKGROUND OF THE INVENTION

The invention relates to a nominal value pick up for drive controls, preferably sew drive controls.

Drive controls in form of position drives for driving a speed shaft with a speed controllable drive motor which is provided with a control, which is coupled with the drive shaft, and pick ups for the actual speed, the nominal speed, the actual position and the nominal position of the operting shaft (U.S. Pat. Nos. 3,487,438, 3,532,953, 3,761,790, 4,011,490).

In the following the invention is explained in more detail in conjunction with a nominal value pick up for sew drive controls. However, the subject described nominal value pick up is also suitable for other types of drives, for example, for drives of tool machines, capacitor winding machines, and the like.

Recently, machine manufacturers more and more use post frames which support the sewing table. Thereby, the mounting of the drive and in particular the mounting of the pedal actuated by the operator and the mounting of the nominal value pick up which is built into the drive for the advance nominal speed and the nominal speed stopping presents difficulties. It is already known to provide a nominal value pick up which is removably mounted in the control box of the drive control and to use it as an external pick up in conjunction with additional parts, like sheet metal housing, additional cables, base plate and clamps. However, this requires cumbersome assembly operations.

SUMMARY OF THE INVENTION

It is therefore an object of the invention to provide a nominal value pick up which can be easier and more expediently adjusted to the different installation conditions which are being encountered in actual practice for the drive or the drive control, respectively.

This object of the invention is obtained in that the nominal value pick up is mounted on the drive as a detachable unit. The design of the nominal value pick up as a complete separate unit permits to mount the pick up on any given place separate from the drive, if so desired, without necessitating additional parts of the aforementioned type.

The handling is further simplified if the nominal value pick up is mounted as a detachable unit on the outside of the control box. In this manner the nominal value pick up is constantly freely accessible. A comfortable mounting adjustment of the nominal value pick up is also possible when the pick up remains stationary mounted on the control box.

In the practice it had been shown that is is often problematic to bring the nominal value pick up into the required alignment with the pedal rods. This is overcome in accordance with another embodiment of the invention in that the nominal value pick up is rotatably mounted around an adjustment pin. Thereafter the nominal value pick up unit may be fixed in its adjusted position advantageously by two or more screws.

If the nominal value pick up should be mounted on a spot removed from the control box of the drive it must be connected to the control box by means of a connecting cable. In order that such a connecting cable is always available in case it is needed, preferably a space for the connecting cable is provided in the nominal value pick up housing. Advantageously, this connecting cable is internally soldered on the inside of the housing, that is, at the end of the nominal value pick up and is provided with a plug externally of the housing. When installing the nominal value pick up only as much connecting cable is withdrawn from the nominal value pick up housing as is needed for bridging the distance to the control box of the drive. The plug is simply mounted on the control box with a corresponding bushing.

In the further embodiment of the invention the nominal value pick up is provided with a dust proof mounted pull rod. The dust proof mounting prevents dust particles to penetrate into the external nominal value pick up unit which could impair the function of the nominal value pick up.

Advantageously the nominal value pick up is provided with a plurality of at least four light barriers which are codeable in accordance with a continuous progression code, in particular a Gray-code. The blinding plate is designed, in particular, as a plastic molded plate or as an etched metal plate, for example.

The invention will be explained in more detail in conjunction with a preferred embodiment.

BRIEF DESCRIPTION OF THE DRAWINGS

FIG. 3 is a view from the left side of FIG. 1 with cut open nominal value pick up housing;

FIG. 6 is a partially cut open view of the slide arrangement of the nominal value pick up;

FIG. 9 is a plan view of the transmitter conductor plate;

FIG. 10 is a longitudinal sectional view through the transmitter conductor plate along line X—X of FIG. 9;

FIG. 11 is a plan view of the base plate of the nominal value pick up;

FIG. 12 is a sectional view along line XII—XII of FIG. 11; and

FIG. 13 is a sectional view along line XIII—XIII of FIG. 11.

DETAILED DESCRIPTION OF THE PREFERRED EMBODIMENTS

Figure 1:
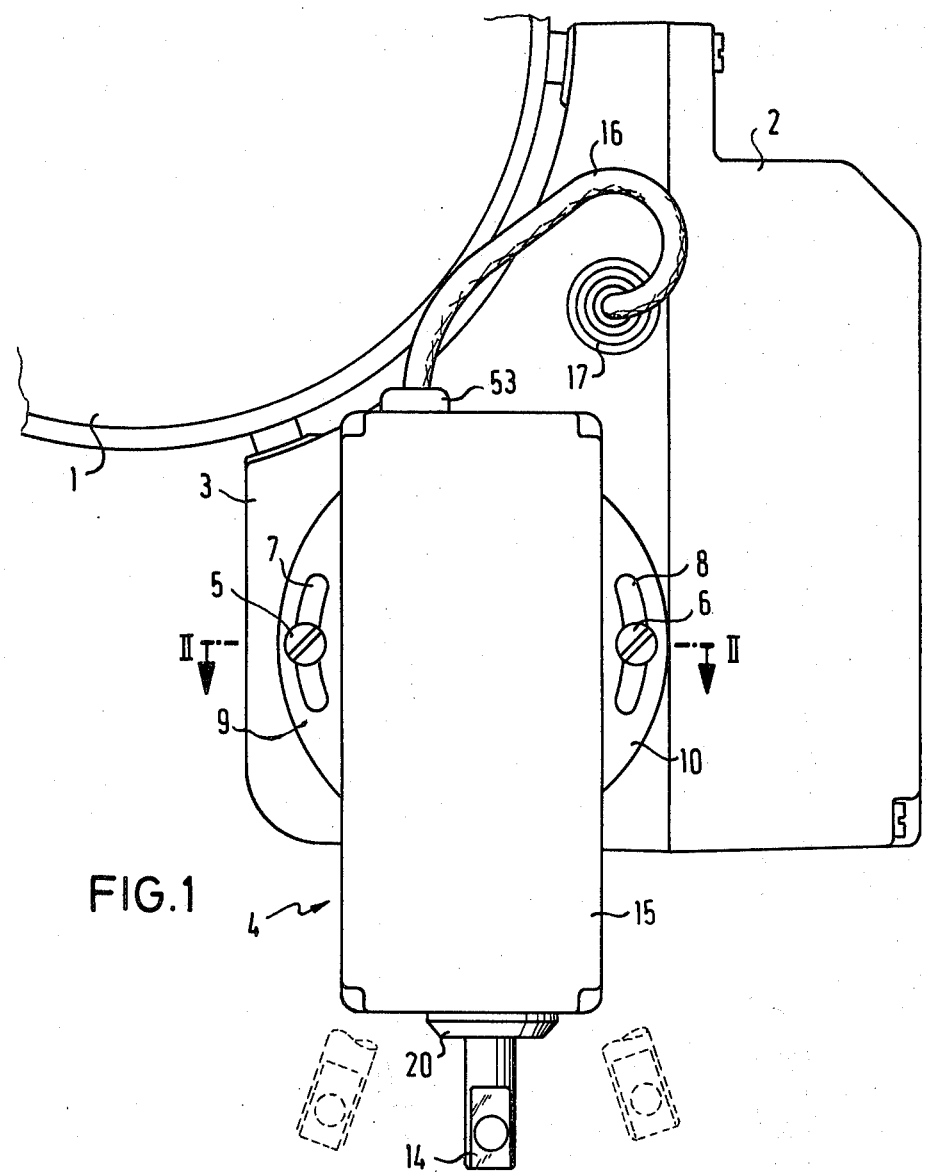
FIG. 1 shows a front face of the control box of a drive control with an externally mounted nominal value pick up unit.
Figure 2:
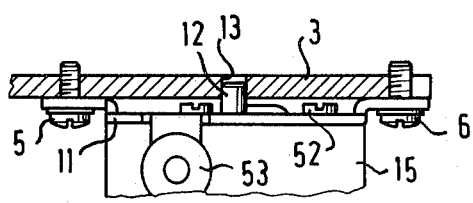
FIG. 2 is a partial sectional view according to line II—II of FIG. 1.

A drive motor 1, in particular a coupling motor is schematically indicated in FIG. 1. Motor 1 is coupled with a control box 2 wherein the speed control and positioning control circuit for the drive motor 1, as well as an associated power transformer are mounted. The control box 2 may be constructed similar to the one described in the older patent application P 29 30 228.1 and therefore does not require any further discussion.

On the one front face 3 of the control box 2 a nominal value pick up 4 for advancing the nominal speed and the nominal stopping position of the operating shaft (not shown) driven by drive motor 1, is detachably mounted as one unit. For this purpose two screws 5,6 are provided which extend through curve shaped longitudinal openings 7,8 in two downwardly offset annular segments 9,10 of a base plate 11 of the nominal value pick up and are screwed into thread bores on the front face 3 of the control box 2. At the annular center point of the longitudinal openings 7,8 the base plate 11 supports an adjusting pin 12 which engages into a corresponding bore 13 of the control box front face 3. After releasing screws 5,6 the nominal value pick up 4 can be turned around the center axis of the adjusting pin 12, so as to align a pull rod 14 of the nominal value pick up with a pedal rod system (not shown).

As can be seen from FIG. 3, a space is provided inside the nominal value pick up housing 15 for receiving a sufficiently long connecting cable 16 which is soldered to the below explained conductor plates of the nominal value pick up and is provided with an external plug 17 through which a connection with the electronic for the drive control within box 2 is established.

The pull rod 14 is mounted on bearing elements 21,22 in an advantageously plastic molded pull rod housing 20. The bearing elements 21,22 are provided at their outwardly directed ends with a conical shaped engagement face 23,24 which are pushed against complementary conical shaped engagement faces 27 or 28, respectively, of the pull rod housing 20 by means of return springs 25,26. The return springs 25,26 support with the one side on a shoulder of bearing elements 21,22 and on the other side on an abutment ring 29 or 30, respectively, which encompasses the pull rod 14 in the same manner as the return springs and supports also on a shoulder of pull rod housing 20. As can be seen in FIG. 6 a locking plate 31 is provided on the upper end of the pull rod housing 20. In this manner a dust proof mounting of the pull rod 14 is provided. Screws 32, one of which is shown in FIG. 6, hold the two halves of the pull rod housing 20 together. The pull rod 14 is provided with a cam block 33 which in turn is provided with a protruding cam pin 34.

Figure 4:
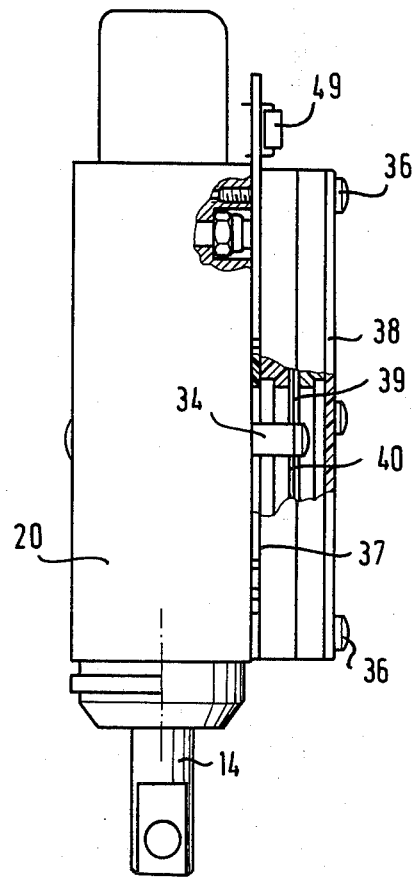
FIG. 4 is a partially cut open view of the nominal value pick up without housing and connection cable.
Figure 5:
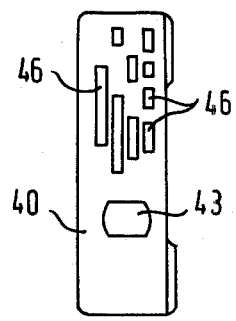
FIG. 5 is a plan view of the blinding plate of the nominal value pick up.
Figure 7:
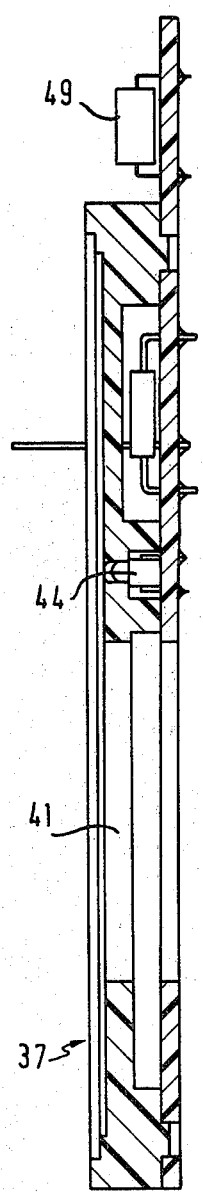
FIG. 7 is a longitudinal sectional view through the receiver conductor plate in accordance with line VII—VII of FIG. 8.
Figure 8:
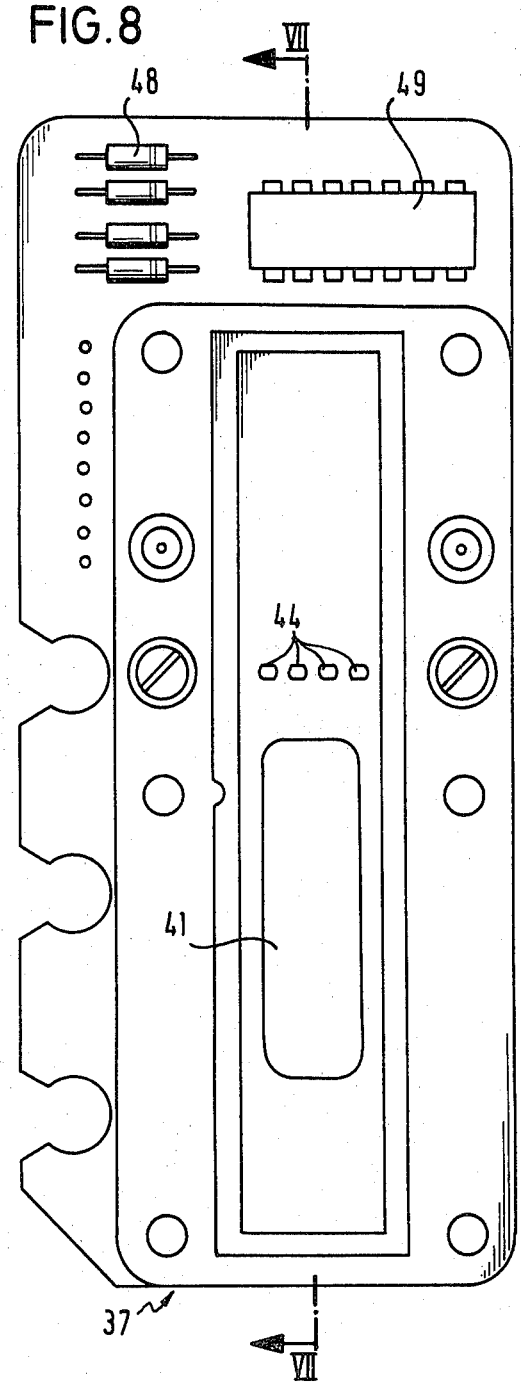
FIG. 8 is a plan view of the receiver conductor plate.

A receiver conductor plate 37 and a transmitter conductor plate 38 are screwed onto the right front face of the pull rod housing 20 by means of screws 36, FIG. 4. The two conductor plates 37,38 form a channel 39 in which a blinding plate 40 (FIG. 5) is displaceably mounted. Thereby, the cam pin 34 engages through a longitudinal opening 41 of the receiver conductor plate 37 and into a correspondingly dimensioned longitudinal opening 42 of the transmitter conductor plate 38, whereby the cam pin extends through a cam opening 43 of blinding plate 40. In the shown embodiment the receiver conductor plate 37 supports four light receivers aligned in transverse direction in form of photo transistors 44. For each photo transistor 44 a photo diode 45, which acts as a light transmitter, is disposed opposite the transmitter conductor plate 38. Thereby, each of the photo transistors together with the associated photo diode form a common light barrier. The blind plate 40 is provided in the zone of light beams 44,45 with control openings 46 distributed on four different tracks. When the pull rod 14 is pulled against the force of the return springs 25,26 over a pedal rod system either downwardly or upwardly from the rest position shown in FIG. 6, the radiation beams of the light barriers 45,46 are released or interrupted in alternating combinations in dependency of the distribution of control openings 46 of the blind plate 40 which is displaceably mounted in channel 39. The control openings 46 are disposed in accordance with a continous progression code, for example, a Gray-code. The decoding of the received light-dark-signals of the four light barriers 44,45, depending from the blind adjustment, is carried out with the assistance of electronic switch components which are mounted on the receiver conductor plate 37 and are indicated at 48,49. By pushing the pedal forward and a corresponding displacement of the pull rod 14 and blind plate 40 a plurality of nominal speed values, for example, twelve may be advanced in this manner, while during the pushing of the pedal to the rear the nominal stopping position of the operating shaft, for example, from a "needle up" to a "needle down:" position may be changed, or vice versa.

The nominal value pick up housing 15 which receives the pull rod housing 20 together with the conductor plates 37,38 and the connecting cable 16 is connected with the base plate 11 with screws 50, for example. The base plate 11 is provided with a recess 51 in which the end of the cam pin 34, facing away from blind plate 40, is guided. Screws 52 connect the pull rod housing 20 with base plate 11. A feed through bushing 53 of the connecting cable 16 is supported by a lug 54 which protrudes from base plate 11.

The nominal value pick up 4 which is designed as a detachable unit cannot be only comfortably adjusted with respect to the control box 2, so as to align the pull rod 14 with the pedal rod system, but may be completely removed from the control box 2 after removing screws 5 and 6 and may be mounted at any given spot separate from the control box. Thereby, the required connecting cable piece may be pulled out of housing 15. Additional parts, like separate sheet metal housings, additional cables, separately mounted mounting plates, and the like, are eliminated. Therefore, the described nominal value pick up simplifies the mounting. The nominal value pick up is economical and operation proof. It permits a universal use of motors at given machine frames.

We claim:

1. In a drive control for controlling a speed and positions of a drive shaft driven by a drive motor, a combination comprising a control box for the drive motor and having an outside wall, and a nominal value pick up for advancing a nominal speed and a nominal stopping position of the drive shaft, said nominal value pick up being releasably attachable to said outside wall of the control box and provided with an adjustment pin, the nominal value pick up being pivotable on said pin with respect to said control box and being fixedly adjusted thereon in one of a plurality of fixed positions, the nominal value pick up including a housing formed with an internal space, a pull rod device mounted in said space and having a pull rod extended outwardly of said housing, said pull rod being movable by an external force, a connecting cable disposed in said internal space and having a first end extended outside the pull rod device and terminated with a plug connected to the control box and a second end, a plurality of light barrier means on said pull rod device and codeable in accordance with a continuous progression code, conductor means interconnected between said second end of said cable and said light barrier means, and a blinding plate in the region of said light barriers and movable in response to the movement of said pull rod to interrupt said light barrier means.

2. The drive control as defined in claim 1, wherein said conductor means include a receiver conductor plate and a transmitter conductor plate.

3. The drive control as defined in claim 2, wherein said light barrier means include light receivers disposed in said receiver conductor plate and light transmitters disposed in said transmitter conductor plate.

4. The drive control as defined in claim 3, wherein said blinding plate is interposed between said receiving conductor plate and said transmitter conductor plate.

5. The drive control as defined in claim 4, wherein said blinding plate is a plastic molded plate.

6. The drive control as defined in claim 4, wherein said blinding plate is an etched metal plate.

7. The drive control as defined in claim 4, wherein said light barrier means are codeable in accordance with Gray code.

8. The drive control as defined in claim 1, wherein said pull rod device is enclosed in a dust proof housing.

* * * * *